United States Patent
Jacobsen

[15] 3,643,534
[45] Feb. 22, 1972

[54] METHOD FOR DIECUTTING SHEET MATERIALS BY MEANS OF A DIECUTTING MACHINE AND A DIECUTTING PLANT FOR THE PERFORMANCE OF THIS METHOD

[72] Inventor: Erik Chresten Jacobsen, Hong, Denmark
[73] Assignee: Vilh Pedersen A/S, Hoeng, Denmark
[22] Filed: Jan. 15, 1970
[21] Appl. No.: 7,299

[52] U.S. Cl. ................................83/29, 83/276, 83/533, 83/539
[51] Int. Cl. .............................................B26d 1/44
[58] Field of Search.................83/29, 202, 276, 533, 539

[56] References Cited

UNITED STATES PATENTS

| | | | |
|---|---|---|---|
| 2,692,020 | 10/1954 | Oberhart | 83/533 X |
| 3,451,299 | 6/1969 | Pretty et al. | 83/533 X |

FOREIGN PATENTS OR APPLICATIONS

| | | | |
|---|---|---|---|
| 945,944 | 1/1964 | Great Britain | 83/533 |
| 1,036,731 | 7/1966 | Great Britain | 83/29 |

*Primary Examiner*—William S. Lawson
*Attorney*—Walter Becker

[57] ABSTRACT

Die cutting of textiles, plastic foil, plastic fabric, paper and similar materials occurs by means of assembly of cutting dies having cutting edges corresponding to parts to be cut with a bridge diecutting machine including an upper pressure plate movable vertically up and down and including table frames having tabletops that form supporting surfaces for a pad for the material. Part of the supporting surfaces nearest to the diecutting machine has a resilient support and is pressed downwardly by the upper pressure plate of the diecutting machine during the downward stroke of the upper pressure plate. There is a step of placing the cutting die corresponding to the parts separately with their cutting edges facing downwards on the material according to a visually determined arrangement, having regard to the pattern of the material and the degree of the utilization of the material. With respect to that part of the pad which during the operation is outside the active scope of the diecutting machine, together with material and the cutting dies, there is a step of following the pressure plate in the movement of the latter so that the cutting dies within the scope of the pressure plate always lie approximately horizontally.

2 Claims, 4 Drawing Figures

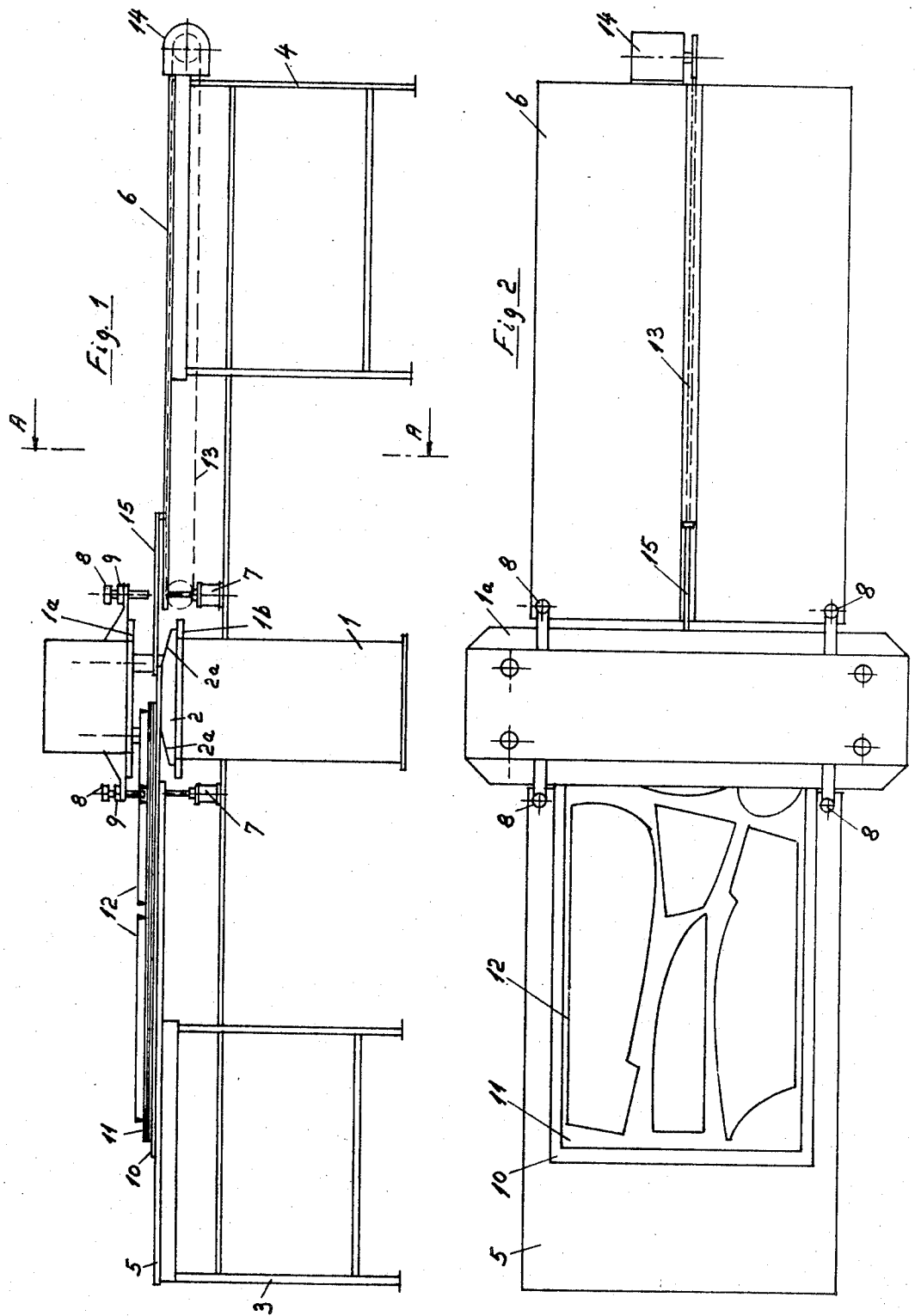

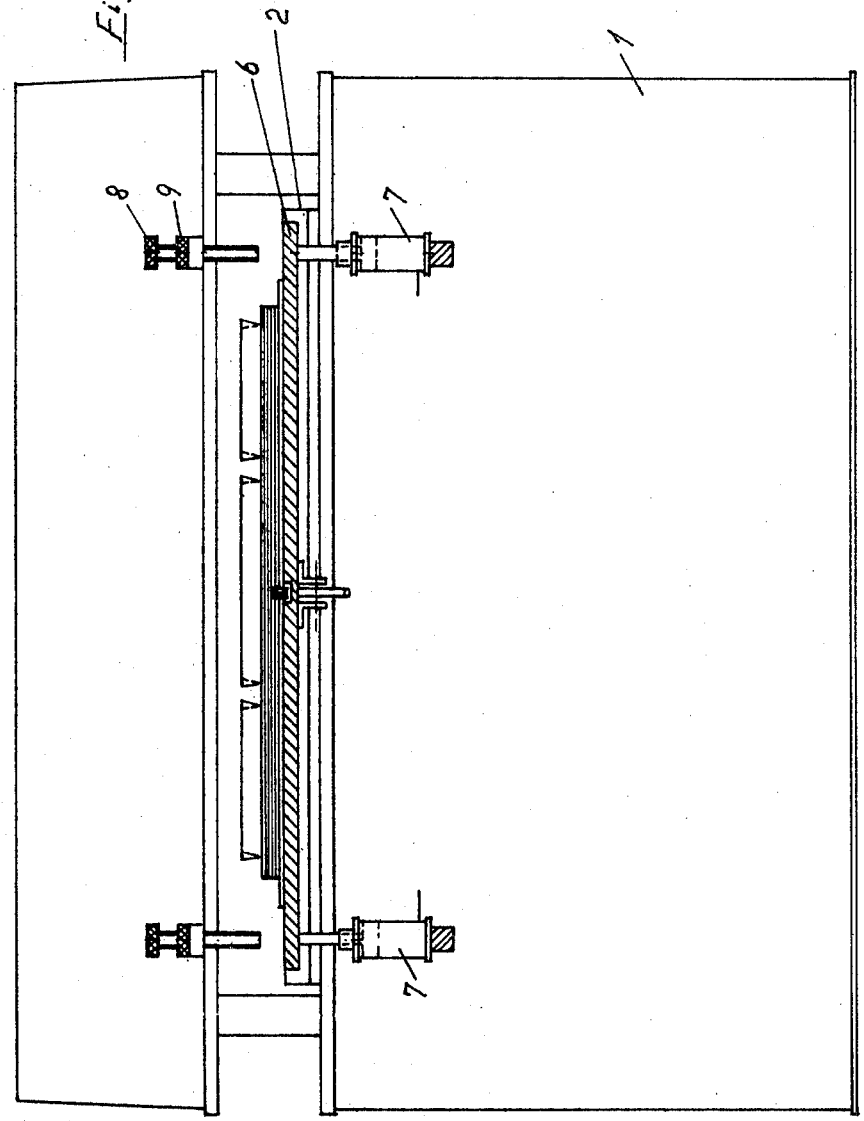

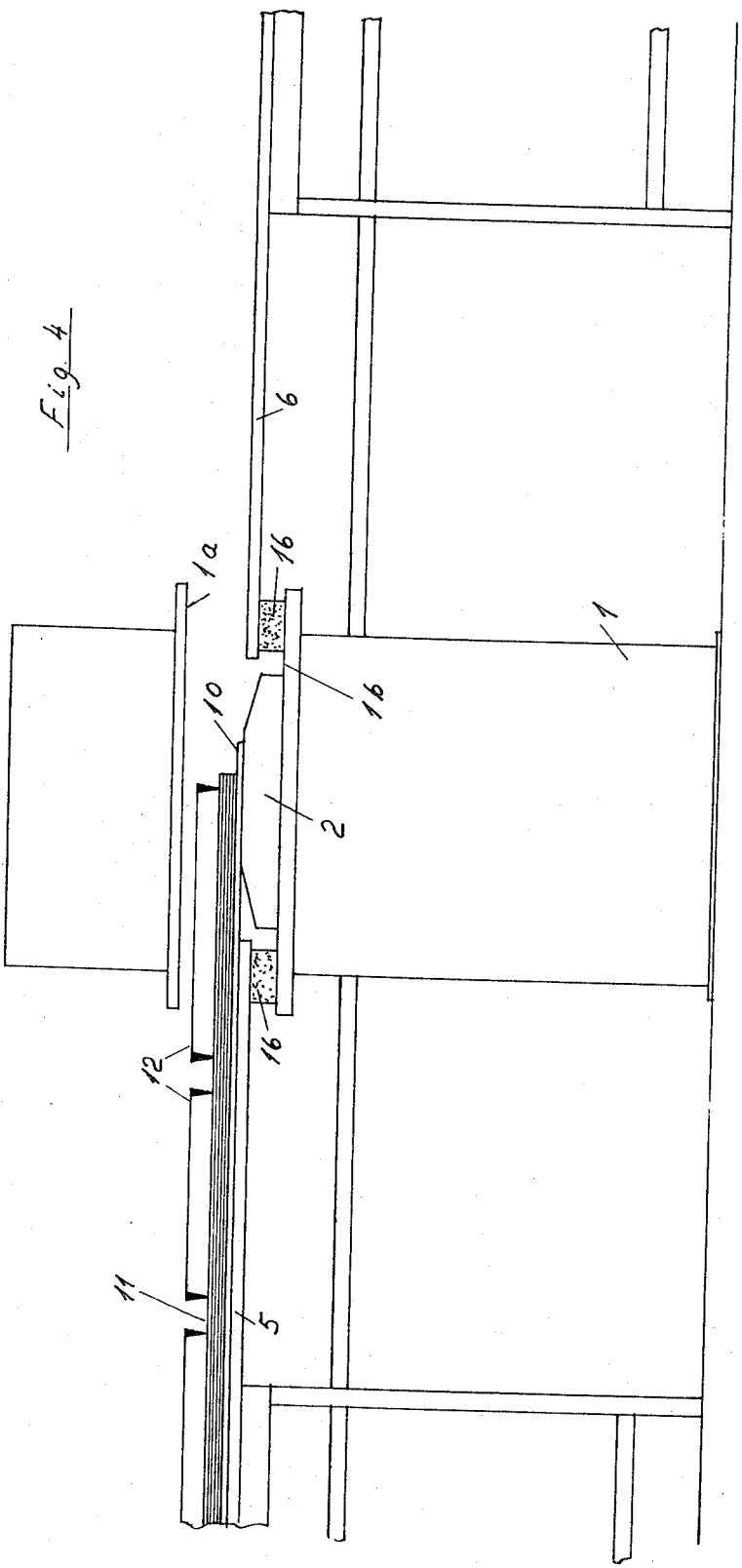

METHOD FOR DIECUTTING SHEET MATERIALS BY MEANS OF A DIECUTTING MACHINE AND A DIECUTTING PLANT FOR THE PERFORMANCE OF THIS METHOD

The invention relates to a method for die cutting of textiles, plastic foil, plastic fabric, paper and similar materials which are available in large sheets or in long lengths and where it is desired to perform die cutting of many different details from the same sheet or the same length of material, for instance all the parts for a complete suit of clothes (lounge suit, coat or dress) or all the parts of plastic or textile for a set of furniture.

Such parts were previously die cut according to two different principles.

1. The material to be cut is placed on a movable tabletop, after which the cutting dies are placed on top of the material, their cutting edges facing downwards against the material, after which the tabletop with the material and the cutting dies are carried into a cutting machine where the cutting is performed, all of the parts being cut in one operation. This method is advantageous where the total surface to be cut is not too extensive, and where the total length of cut is not too large either, since, if so, these two factors will necessitate the use of a cutting machine of large dimensions and with a high cutting pressure, which results in the cutting machine becoming too expensive on account of its size and its pressure, consequently rendering the die-cutting operation unprofitable.

2. The other principle which is then alternatively used in die cutting "with the cutting edge facing upwards." In this case the cutting dies are built together so as to form a whole, or fitted on a tabletop with their cutting edges facing upwards, the material being placed on top of the cutting dies, after which the tabletop with the cutting dies is carried into the cutting machine, which cuts the parts successively. This method is advantageous in the case of a very uniform production, but in order for the cutting operation to be made step by step, the material must be placed on top of the cutting dies, and it is therefore impossible to see how the cutting dies are arranged in relation to a possible pattern in the material.

In the readymade clothing industry, for instance where the production program comprises a greatly varied production with many models and many sizes varying both in height and in width, and many different fabrics of different textures and patterns and different widths, it is not possible to use the system known so far where the cutting dies are placed firmly and immovably on the base, and where the replacement of a set of cutting dies from one model to another is too troublesome and time-consuming, since the tabletop with the cutting dies for a complete garment is most often 3.5 meters in length and 0.8 meters in width. Such a tabletop is further difficult to handle. Consequently it has been attempted to place the cutting dies individually on top of the material, afterwards turning the whole of it upside down so as to cause the material to be placed on top of the cutting dies, thus enabling the cutting operation to be made successively.

The fact is that, so far, it has been necessary to have the material placed on top of the cutting dies when the cutting operations is to be performed successively, since otherwise the cutting dies are likely to be bent. However, this solution has proved in practice to require a machinery or a plant which would be too extensive or too unwieldy to operate, especially where materials of very large widths are processed.

The object of the invention is to provide a method enabling by simple arrangement the cutting in one and the same operation, for instance of all of the parts for a lounge suit, with the corresponding set of cutting dies and using a comparatively small cutting machine having regard to the object in view, further enabling the arrangement and placing of the cutting dies individually having regard to the pattern of the material in question and the degree of utilization of the material, and in such a way that the cutting dies will remain on top of the material while the cutting is going on successively.

This object is achieved by the method according to the invention having features described herein.

The invention further relates to a cutting plant for the performance of this method, and such a cutting plant according to the invention having features stated in the following description.

In this way it is achieved that the cutting can be made by means of a die-cutting plant which is cheap in investment and simple and quick in operation, both for materials of small and large widths.

The invention will be explained in detail below in connection with the drawing, which shows two examples of embodiments of a die-cutting plant according to the invention, FIGS. 1 and 2 showing respectively a side and a top view of an embodiment of the plant, FIG. 3 a section along the line A-A in FIG. 1, and FIG. 4 a side view of a simplified embodiment.

In the embodiment shown in FIGS. 1 and 2, the plant consists of a bridge die-cutting machine 1, for instance a four-column sheet die cutting machine, whose upper pressure plate 1a is moved vertically up and down and on whose lower pressure plate 1b a block 2 has been fitted, both sides of the said block being provided with oblique surfaces 2a. On either side of the die-cutting machine a table frame 3, respectively 4, has been arranged with a tabletop 5, respectively 6, of a flexible material. Nearest to the die cutting machine these tabletops are carried by resilient components 7, for instance air cylinders, which are provided with compressed air via a reduction valve in a generally known manner for easy regulation of their carrying capacity. Over the resilient components and in the same vertical line adjustment screws 8 with locknuts 9 are fitted on the bridge of the die-cutting machine.

On the tabletop 5 is arranged a flexible pad 10, for instance a nylon sheet carrying the material 11 which is to be cut, the cutting dies 12 being placed on the material as determined by the pattern. By means of a chain drive 13 with a driving unit 14 and a pull rod 15 connecting the chain 13 with the cutting pad 10, the said cutting pad 10 can be conveyed step by step from the tabletop 5 through the die cutting machine and on to the tabletop 6.

The cutting operation is performed in the following way:

After the material 11 and the cutting die 12 has been placed on the pad 10, the latter is conveyed into the position where it is found in FIG. 1, after which the cutting stroke is released, and the upper pressure plate 1a of the cutting machine will now press the first cutting dies through the material down to the pad 10, the block 2 with the plane part of its surface providing the necessary counter pressure. The part of the material 11 and the pad 10 which is over the oblique surface 2a of the block 2 will at the same time bend downwards on account of the cutting pressure, while at the same time the screws 8 will press the ends of the tabletops 5 and 6 downwards. The distance from these screws down to the tabletops in the position shown in FIG. 3 is at the most equal to the distance from the upper pressure plate of the die-cutting machine and down to the upper edge of the cutting dies placed on the material. When the upper pressure plate of the die-cutting machine again moves upwards, the ends of the tabletops 5 and 6 will come up with it to the positions shown, being lifted by the resilient components 7.

After the upper pressure plate of the die-cutting machine has again reached its top position, the pad 10 with material and cutting dies is carried a distance further into the diecutting machine, corresponding to the width of the plane piece of the block 2 or a little less, if suitable, and a new cutting stroke is performed, and so on, until the whole of the material has been cut.

That is to say, that during each cutting operation the ends of the tabletops 5 and 6 will be pressed somewhat downwards, allowing the pad 10 and the material 11 to come down with them, thus preventing the cutting dies 12 from being bent, seeing that the part of the dies that are active at the moment of cutting are well supported by the upper pressure plate of the die-cutting machine, and the part of the cutting dies which extend beyond the pressure plate will not get any counter pressure from the subjacent material, seeing that the latter is lowered together with the ends of the tabletops 5 and 6.

Further, automation of the whole of the operation is possible in an actually known manner, so that each cutting stroke will automatically be followed by a transport of the desired length, which will again be followed by a cutting stroke, and so on, until the whole of the operation has been completed.

The arrangement shown is advantageous in the case of die-cutting machines with large processing widths. In the case of die-cutting machines with smaller processing widths a simpler arrangement as shown in FIG. 4 will often be applicable.

Here the resilient component carrying the tabletops 5 and 6 consists of some pieces of rubber foam 16, and here the force required for pressing down the ends of the tabletops 5 and 6 will move from that part of the upper pressure plate 1a of the die cutting machine which extends in width beyond the block 2, and through the cutting dies 12, the material 11 and the pad 10. Since the part of the cutting dies which transmit this force are also well supported by the upper pressure plate 1a of the die cutting machine, it is also impossible by this arrangement for the cutting dies to band under the cutting stroke. Also in the case of this arrangement it is easily feasible to mechanize the transport of the pad 10 and synchronize the transport with the cutting stroke so as to make the operation proceed automatically.

What I claim is:

1. Method for die-cutting of textiles, plastic foil, plastic fabric, paper and similar materials by means of any assembly of cutting dies whose cutting edges correspond to the parts which it is desired to have cut, for which purpose the cutting dies are arranged in the desired pattern on the material, which is placed on a pad which together with the material is carried step by step into the die-cutting machine, comprising steps of placing the cutting dies corresponding to the parts separately with their cutting edges facing downwards on the material according to a visually determined arrangement, having regard to the pattern of the material and the degree of the utilization of the material, and in that the part of the pad which during the operation is outside the active scope of the die-cutting machine, together with material and the cutting dies, following the pressure plate in the movement of the latter, so that the cutting dies within the scope of the pressure plate will always be lying approximately horizontally.

2. Die-cutting plant for die cutting of textiles, plastic foil, plastic fabric, paper and similar materials with a bridge die-cutting machine, including an upper pressure plate movable vertically up and down, and table frames having table tops that form supporting surfaces for a pad for the material, the improvement therewith which comprises part of the supporting surfaces nearest to the die-cutting machine being resiliently supported and pressed downwards by the upper pressure plate of the die-cutting machine during the downward stroke of the upper pressure plate.

* * * * *